United States Patent
Zhuo et al.

(10) Patent No.: US 9,171,355 B2
(45) Date of Patent: Oct. 27, 2015

(54) NEAR INFRARED GUIDED IMAGE DENOISING

(71) Applicant: QUALCOMM Incorporated, San Diego, CA (US)

(72) Inventors: Shaojie Zhuo, Markham (CA); Xiaopeng Zhang, Richmond Hill (CA); Chen Feng, Markham (CA); Liang Shen, Toronto (CA); Jiaya Jia, Hong Kong (HK)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/151,589

(22) Filed: Jan. 9, 2014

(65) Prior Publication Data

US 2015/0125092 A1     May 7, 2015

Related U.S. Application Data

(60) Provisional application No. 61/811,610, filed on Apr. 12, 2013.

(51) Int. Cl.
    *G06K 9/40*      (2006.01)
    *G06T 5/00*      (2006.01)
    (Continued)

(52) U.S. Cl.
CPC . *G06T 5/002* (2013.01); *G06T 5/50* (2013.01); *G06T 7/004* (2013.01); *G06T 2200/21* (2013.01);
(Continued)

(58) Field of Classification Search
CPC ..... G06K 9/3233; G06K 9/46; H04N 1/3871; H04N 1/58; H04N 5/217; H04N 5/332; H04N 9/64; H04N 13/0022; H04N 2013/0081; G06T 5/00; G06T 5/001; G06T 5/002; G06T 5/005; G06T 5/006; G06T 5/007; G06T 5/008; G06T 5/10; G06T 5/50; G06T 7/004; G06T 7/0024; G06T 7/0026; G06T 7/0028; G06T 7/0065; G06T 2207/20012; G06T 2207/20061; G06T 2207/20064; G06T 2207/20144; G06T 2207/20182; G06T 2207/20192; G06T 2207/20204; G06T 2207/20221; G01J 3/32; G01S 17/89; H01L 27/14649; H01L 27/1465; H01L 27/14652
See application file for complete search history.

(56) References Cited

U.S. PATENT DOCUMENTS

| 8,374,457 B1 * | 2/2013 | Wang et al. ................. 382/266 |
| 2007/0024742 A1 | 2/2007 | Raskar et al. |

(Continued)

FOREIGN PATENT DOCUMENTS

EP     2309449 A1     4/2011

OTHER PUBLICATIONS

Firmenich D. et al., "Multispectral interest points for RGB-NIR image registration", Image Processing (ICIP), 2011 18th IEEE International Conference on, IEEE, Sep. 11, 2011, pp. 181-184, XP032079970.

(Continued)

*Primary Examiner* — Jose Couso
(74) *Attorney, Agent, or Firm* — Knobbe, Martens, Olson & Bear LLP

(57) ABSTRACT

Systems and methods for multispectral imaging are disclosed. The multispectral imaging system can include a near infrared (NIR) imaging sensor and a visible imaging sensor. The disclosed systems and methods can be implemented to de-noise a visible light image using a gradient scale map generated from gradient vectors in the visible light image and a NIR image. The gradient scale map may be used to determine the amount of de-noising guidance applied from the NIR image to the visible light image on a pixel-by-pixel basis.

30 Claims, 5 Drawing Sheets

(51) Int. Cl.
*G06T 5/50* (2006.01)
*G06T 7/00* (2006.01)

(52) U.S. Cl.
CPC ............... *G06T 2207/10016* (2013.01); *G06T 2207/10024* (2013.01); *G06T 2207/10048* (2013.01); *G06T 2207/20012* (2013.01); *G06T 2207/20192* (2013.01)

(56) References Cited

U.S. PATENT DOCUMENTS

| | | |
|---|---|---|
| 2010/0290703 A1 | 11/2010 | Sim et al. |
| 2011/0052029 A1 | 3/2011 | Connah et al. |
| 2011/0292216 A1 | 12/2011 | Fergus et al. |
| 2013/0250123 A1 | 9/2013 | Zhang et al. |

OTHER PUBLICATIONS

International Search Report and Written Opinion—PCT/US2014/033197—ISA/EPO—Jul. 18, 2014.
Li Z. et al., "Quadratic optimization based small scale details extraction", Acoustics, Speech and Signal Processing (ICASSP), 2011 IEEE International Conference on, IEEE, May 22, 2011, pp. 1309-1312, XP032000985.
Matsui S., et al., "Image Enhancement of Low-Light Scenes with Near-Infrared Flash Images", Sep. 23, 2009, Lecure Notes in Computer Science, Springer, DE, pp. 213-223, XP019141340.
Aharon M, et al., "K-SVD: An Algorithm for Designing Overcomplete Dictionaries for Sparse Representation", IEEE Transactions on Signal Processing, 2006, vol. 54 (11), pp. 4311-4322.
Perona, P., et al., "Scale-Space and Edge Detection Using Anisotropic Diffusion," IEEE Transactions on Pattern Analysis and Machine Intelligence, vol. 12, No. 7 (Jul. 1990); pp. 629-639.
Buades A, et al., "A Non-Local Algorithm for Image Denoising", In Proceedings of IEEE Computer Vision and Pattern Recognition, Conference—Jun. 20-25, 2005; vol. 2; pp. 60-65.
Choi B.S., et al., "Multi-spectral Flash Imaging using Weight Map," The 19th Korea-Japan Joint Workshop; IEEE Frontiers of Computer Vision, (FCV); Kyungpook Nat. University, South Korea; Conference Jan. 20-Feb. 1, 2013; pp. 272-275.
Dabov K, et al., "Image Denoising by Sparse 3-D Transform-Domain Collaborative Filtering", IEEE Transactions on Image Processing, Aug. 2007, vol. 16 (8), pp. 2080-2095.
Eisemann E, et al., "Flash Photography Enhancement via Intrinsic Relighting", ACM Transactions on Graphics, Aug. 2004, vol. 23 (3), pp. 673-678.
Farbman Z, et al., "Edge-Preserving Decompositions for Multi-Scale Tone and Detail Manipulation", ACM Transactions on Graphics, Aug. 2008, vol. 27 (3), Article 67; pp. 1-10.
Figueiredo M. A. T., et al., "Majorization-Minimization Algorithms for Wavelet-Based Image Restoration", IEEE Transactions on Image Processing, Dec. 2007, vol. 16 (12), pp. 2980-2991.
Krishnan D, et al., "Dark Flash Photography", ACM Transactions on Graphics, Proceedings SIGGRAPH; Jul. 2009, vol. 28; pp. 1-11.
Petschnigg G, et al., "Digital Photography with Flash and No-Flash Image Pairs", ACM Transactions on Graphics, Proceedings SIGGRAPH; Aug. 2004, vol. 23 (3); pp. 664-672.
Portilla J, et al., "Image Denoising Using Scale Mixtures of Gaussians in the Wavelet Domain", IEEE Transactions on Image Processing, Nov. 2003, vol. 12 (11), pp. 1338-1351.
Roth S, et al., "Fields of experts", International Journal of Computer Vision, Apr. 2009, vol. 82 (2), pp. 205-229.
Zhang X., et al., "Enhancing Photographs with Near Infrared Images", IEEE Computer Society Conference on Computer Vision and Pattern Recognition, Anchorage, US, Jun. 23-28, 2008, pp. 1-8.
Zhuo S, et al., "Enhancing Low Light Images Using Near Infrared Flash Images", $17^{th}$ IEEE International Conference on Image Processing, Hong Kong, Sep. 26-29, 2010, pp. 2537-2540.

* cited by examiner

NEAR INFRARED GUIDED IMAGE DENOISING

CROSS-REFERENCE TO RELATED APPLICATIONS

The present application claims the benefit under 35 U.S.C. §119(e) of U.S. Provisional Patent Application No. 61/811,610, filed on Apr. 12, 2013, entitled "NEAR INFRARED GUIDED IMAGE DENOISING," the entire contents of which is hereby incorporated by reference herein in its entirety and for all purposes.

BACKGROUND OF THE INVENTION

1. Field of the Invention

The present disclosure relates to imaging systems and methods that include a de-noising process. In particular, the disclosure relates to systems and methods that use a near infrared image to guide the de-noising process.

2. Description of the Related Art

It can be challenging to take high quality photographs and videos under low light conditions. Without sufficient ambient light, photographers generally have four options to increase picture quality. The first option is to use a high ISO when capturing the image. Increasing sensor gain can effectively increase signal strength to get bright images within short exposure time. However, the image noise is inevitably increased as well, thus the signal-to-noise ratio (SNR) is not improved.

A second option is to capture the image using a large aperture. Allowing more light pass through camera lenses is a very straightforward way to improve image quality, however changing aperture size will also affect depth of field. Further, the effect is very limited when sensor and lens have been built to accommodate a small form factor, e.g. cell phone cameras.

A third option is to use long exposure time to capture the image. Extended exposure time can increase SNR, but may increase undesired motion blur in the captured image.

A fourth option is to employ flash or other strong artificial light to the scene in order to obtain a sharp, noise-free image. However, as the color temperature and intensity of flash light are usually quite different from those of the ambient light, the use of flash may ruin ambiance atmosphere and introduce unwanted artifacts, such as red eye, undesired reflections, harsh shadows, and intense light highlights and reflections.

Out of above four options, photographers usually prefer to use high ISO images and apply noise reduction to the captured image. Image de-noising is an intensively studied problem and numerous methods exist. However, even with the state-of-the-art image de-noising methods, it is still very difficult to obtain a high quality noise-free photo, especially when noise level is high.

Conventional single-image de-noising solutions consist of several different methods. Image filtering based methods selectively smooth parts of a noisy image. Wavelet-based methods rely on the careful shrinkage of wavelet coefficients. Image prior based methods learn a dictionary from noise-free images and de-noise images by approximating them using a sparse linear combination of the elements in the dictionary. More recent approaches exploit the "non-local" property of natural images: small patches in natural images tend to repeat themselves within the image. In the last class of methods, BM3D well represents the state-of-the-art in single image de-noising. However, a common fundamental problem with single-image de-noising approaches is that they are not able to distinguish between noise and original image signals, especially with respect to the finer image details. Hence, those approaches generate reasonably good-quality results for images with relatively low noise levels, but generally produce over-smoothened results with many artifacts for images containing high noise levels.

In an attempt to overcome the limitations of the single-image de-noising approaches described above, dual-image de-noising methods introduce another image to guide the de-noising process. Two images are captured of the same scene. Image filtering of the first image using the guidance of the second image is then applied to better preserve image structure, and image detail transfer may be applied to enhance fine image details. For example, the guidance image may be captured under different lighting conditions than the first image, and therefore may contain a different level of detail of the image scene. The additional details in the guidance image may be used to enhance the quality of the first image. The first type of dual-image de-noising methods uses a visible flash image as the guidance image. However, this method can easily blur weak edges and introduce artifacts from the guidance image. Additionally, the visible flash is intrusive to use under low-light conditions, and is even prohibited in certain environments.

Most recently, a second type of dual-image de-noising method has emerged which uses an "invisible flash," for example a flash using near infrared or ultra violet light, in order to capture an image outside of the visible light band, and use that "dark flash" image to help denoise a corresponding visible light image. Gradient transfer via a simple Poisson equation can be adopted for de-noising the visible light image using the dark flash image as a reference. Such methods are able to perform de-noising and detail transfer simultaneously and sometimes achieve high quality de-noising results. However, the gradient constraint from the dark flash image may be too heuristic and not well adapted to handle the differences between the visible light image and the dark flash image. This results in a noticeable appearance change in the de-noising results, especially when handling images with intensive noise.

BRIEF DESCRIPTION OF THE DRAWINGS

Specific implementations of the invention will now be described with reference to the following drawings, which are provided by way of example, and not limitation.

DETAILED DESCRIPTION

Figure 1:
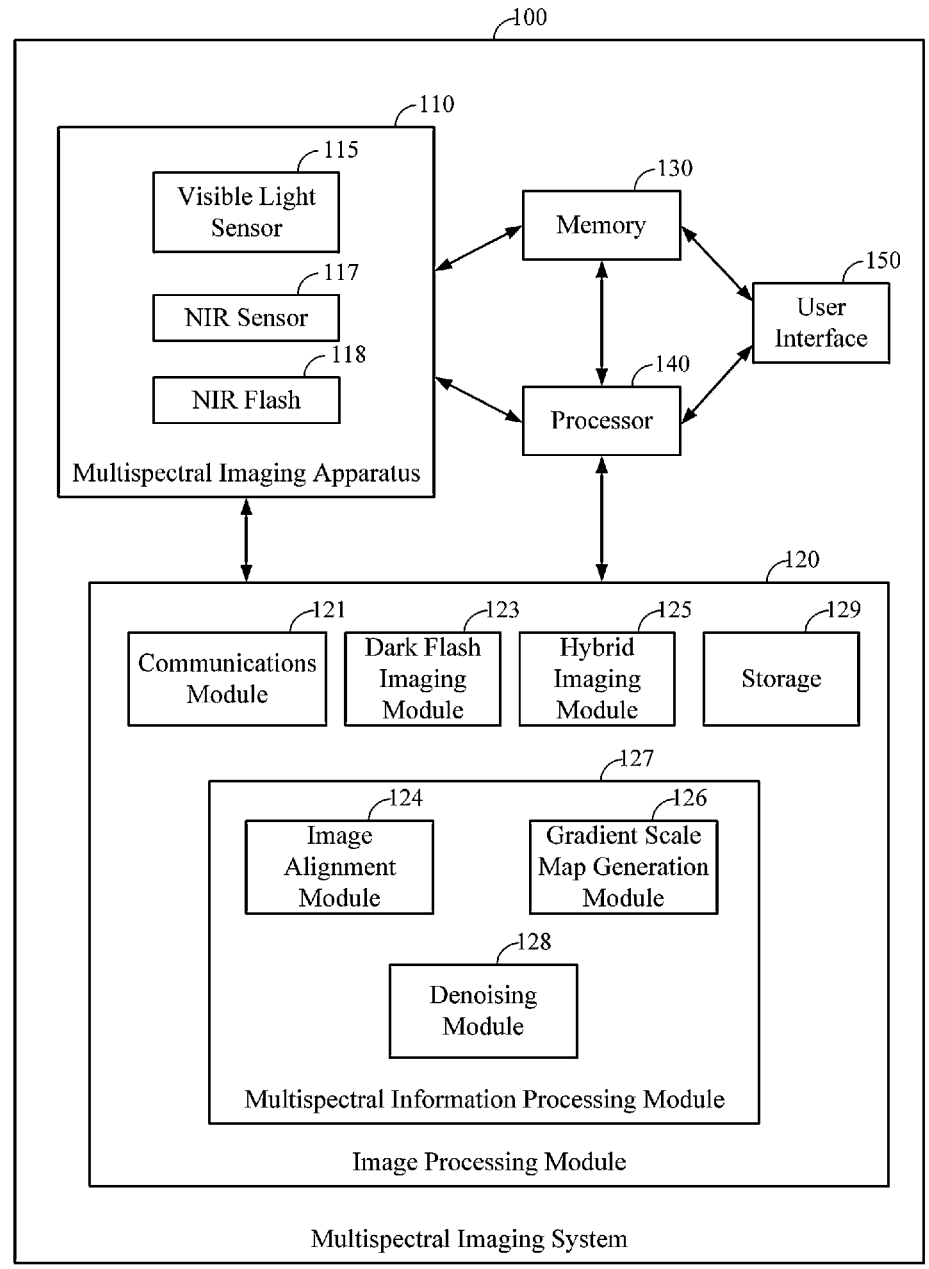
FIG. 1 is a schematic block diagram of a multispectral imaging system, according to one implementation.

Implementations disclosed herein provide systems, methods and apparatus for image de-noising applications. For example, as explained herein, it can be desirable to process a high-quality image from a noisy visible light image using a corresponding dark flash image, such as a near infrared (NIR)

image. Although embodiments are described herein as employing NIR images, it will be appreciated that infrared and ultraviolet flash images may be used as well. The implementations disclosed herein can be used to capture a pair of visible light, for example RGB, and NIR images of the same image scene. During a de-noising process, the visible light and NIR images may be aligned on a pixel bases, and a gradient scale map may be introduced to relate gradient fields of the aligned visible light and NIR images.

The gradient scale map may be generated based on the differences and similarities between the gradient vectors of the visible light image and the gradient vectors of the NIR image. The gradient vectors can be used to detect continuities and discontinuities in intensity values between regions of pixels in the image. The continuities and discontinuities may represent boundaries of objects in the image, variations in scene illumination, discontinuities in depth, and changes in material properties.

The gradient vectors of an image can be determined at each pixel by convolving the image with horizontal and vertical derivative filters. For example, gradient vectors along the x- and y-directions may be calculated for a group of pixels, such as an overlapping region between the NIR and visible light images. In some embodiments, the gradient vectors may be calculated by convolving the image with horizontal and vertical derivative filters. For each group of pixels considered, the derivative filters can be applied to calculate the first or second derivative in the horizontal and vertical directions, representing the horizontal and vertical changes in pixel intensity values. This produces a gradient vector value which can be assigned to the center pixel in the group of pixels. Accordingly, the intensity values in a region around each pixel can be used to approximate the corresponding gradient vector value at the pixel. The gradient vector values of the pixels in the image can be combined to calculate gradient magnitude vectors and gradient direction vectors. The gradient direction vectors and gradient magnitude vectors provide information on the location of object boundaries and about the different intensity values of regions of pixels on either side of the boundaries. For example, object boundary pixels can be located at local maxima of gradient magnitudes.

In order to facilitate the denoising methods described herein, the visible light image and the NIR image may be aligned on a pixel-by-pixel basis and cropped to an overlapping region. A gradient scale map may be generated by computing the difference in, or ratio between, the values of the gradient vectors of the visible light image and the gradient vectors in the NIR image. The gradient scale map accordingly captures the nature of structure discrepancies and similarities between images, and may have clear statistical and numerical meanings for use in the denoising processes described herein.

In some embodiments, the gradient scale map may be assigned a positive value or a negative value for each pixel location. For example, a positive value may indicate that an edge or structure is present with similar gradient direction vectors in both the visible light image and the NIR image. A negative value may indicate that an edge or structure is present in both the visible light image and the NIR image, but the direction of the local gradient vector in the NIR image is reversed relative to the local gradient vector in the visible light image. A value of zero may indicate that an edge or structure is present in the NIR image which is not present in the visible light image, for example due to highlights and shadows resulting from the NIR flash, or that an edge or structure present in the visible light image is not present in the NIR image, for example due to the different reflectance properties of an object in the scene to red and infrared light. Based on an analysis of these values in the gradient scale map, an optimal ratio map for de-noising by gradient transfer may be generated considering adaptive smoothing, edge preservation and guidance strength manipulation. The optimal ratio map may represent the amount of guidance from the NIR image which will be applied to the visible light image at each pixel. By utilizing the gradient scale map and gradient transfer scheme, the de-noising methods described herein are better able to leverage the NIR image as a guidance image to achieve high quality image de-noising, and may do so without introducing additional artifacts into the de-noised visible light image from the guidance image.

In an embodiment, an imaging apparatus may capture images using two different types of imaging sensors, for example a NIR sensor and a visible light sensor. This type of multispectral imaging can be useful de-noising the image captured by the visible light sensor. In one embodiment, the light received at the visible light sensor can carry color information of a scene, while the light captured by the NIR sensor can be used to enhance the quality of the visible light image by performing image de-noising. For example, the NIR image and visible light image may be decomposed into gradient vectors and used to create a gradient scale map. As described above, the gradient scale map may be used to guide de-noising of the visible light image by the NIR image to improve the quality of the captured visible light image.

In one embodiment, an image captured by a NIR sensor is used to enhance the quality of visible light images captured in low light conditions. For example, in conventional low light systems, a visible flash system is often used to illuminate the object to be imaged. However, such artificial light may ruin the ambience of the image and may introduce unwanted artifacts like red eye, undesired reflections, and shadows. In the methods described herein, a NIR flash lamp may be used instead of a visible flash to capture a NIR image, and a conventional visible imaging sensor (such as a RGB color CCD) captures a corresponding visible light image. The NIR image may not be contaminated with noise as in the visible light image, and the NIR image may be used in conjunction with a denoising technique (such as a weighted least squares smoothing technique) to remove noise from the visible (e.g., RGB) image caused by low lighting conditions. Though discussed primarily within the context of a NIR guidance image captured using NIR flash, the NIR guidance image may also be captured in some embodiments without a flash using an image sensor configured to detect the infrared or near-infrared light naturally present in an image scene.

NIR (near-infrared) light is invisible to the human eye, but can be captured by image sensors. With non-intrusive NIR flash, a high quality noise-free NIR photo is captured to guide de-nosing and detail recovery in a corresponding RGB image. Some embodiments may capture a pair of RGB and NIR images simultaneously and subsequently align the RGB and NIR images pixel-wise. Such an image pair can be captured using dual camera system, a single camera which captures sequential RGB-NIR shots in static scenes, by a single RGB-IR camera, or by a stereo RGB-NIR camera system as described in U.S. application Ser. No. 13/663,897, filed Oct. 30, 2012, the entirety of which is herein incorporated by reference.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination may correspond to a return of the function to the calling function or the main function, or a similar completion of a subroutine or like functionality.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

System Overview

Turning now to FIG. 1, illustrated is a schematic block diagram of a multispectral imaging system 100. The multispectral imaging system 100 can include a multispectral imaging apparatus 110. The multispectral imaging apparatus 110 can be configured to include one or more multispectral imaging sensors that can sense a broad band of wavelengths, including at least visible light wavelengths and near infrared (NIR) light wavelengths. For example, the multispectral imaging apparatus 110 can be configured to detect light at wavelengths between about 390 nm and about 1400 nm. Of course, the imaging apparatus 110 can also be configured to detect a much broader range of wavelengths as well. In some implementations, a charge-coupled device (CCD) can be used as the multispectral imaging sensor(s). In other implementations, a CMOS imaging sensor can be used as the multispectral imaging sensor(s). In addition, a flash module 118 and/or other accessories may be included in the multispectral imaging apparatus 110 to help illuminate the scene. In various implementations, the flash module 8 can include visible and/or NIR flash devices.

In the implementation shown in FIG. 1, the multispectral imaging apparatus 110 includes two separate sensors instead of a single multispectral imaging sensor. In this implementation, the multispectral imaging apparatus 110 includes a visible light sensor 115 and a separate NIR sensor 117. For example, the multispectral imaging apparatus 110 has a first, visible sensor 115 such as a CCD/CMOS sensor capable of detecting visible light at least in the range between about 390 nm and about 800 nm. The multispectral imaging apparatus 110 further includes a second, NIR sensor 117, such as a CCD/CMOS sensor that is capable of detecting NIR light in the range between about 800 nm and about 1400 nm. In some implementations, the wavelength ranges for the visible and NIR sensors can overlap or can even be substantially the same. In some implementations, imaging filters, such as a NIR pass filter, can be used on a suitable CCD/CMOS sensor to detect only the NIR data. In one implementation, for example, both the visible light sensor 115 and the NIR sensor 117 can be implemented on a Samsung® S5K4E1GX QSXGA CMOS sensor. The NIR sensor 117 can be implemented by removing an IR-cutoff filter to enable the sensor to receive NIR light. The modified, NIR sensor 117 can be further covered by an IR filter to filter out lower wavelengths, e.g., wavelengths less than about 800 nm. For example, a Kodak® Wratten IR filter (#87C) can be applied over the NIR sensor 117. In other implementations, various other sensors or combinations thereof can be used to capture visible and NIR image data.

In some implementations, the multispectral imaging system 100 may capture a pair of RGB and NIR images simultaneously. The multispectral imaging system 100 can, in other embodiments, capture the NIR image within a predetermined time interval of capturing the RGB image, and the predetermined time interval may be short enough that the pair of images can be of substantially the same scene. The NIR image may be captured using NIR flash or by capturing an image using NIR ambient light present in the target image scene. The visible image may be captured using flash or ambient light.

The multispectral imaging system 100 further includes a processor 140 and a memory 130 that are in data communication with each other and with the imaging apparatus 110. The processor 140 and memory 130 can be used to process and store the images captured by the imaging apparatus 110. In addition, the multispectral imaging system 100 can include a user interface (UI) 150 configured to provide input/output (I/O) operations to the user. For example, the UI 150 can include a display that presents various icons to the user. The UI 150 may also include various input devices, such as a keyboard, touch-screen input, mouse, rollerball, data inputs (e.g., USB or wireless), and/or any other suitable type of input device. The UI 150 can be programmed to allow the user to manipulate image data and/or to select the imaging mode that the user desires to use. The UI 150 may also include controls for capturing the multispectral image data.

Further, the processor 140 and memory 130 can be configured to implement processes stored as software modules in an image processing module 120 and configured to process multispectral image data captured by the multispectral imaging apparatus 110. The image processing module 120 can be implemented in any suitable computer-readable storage medium, such as a non-transitory storage medium. The image processing module 120 can have any number of software modules. For example, a communications module 121 can be implemented on the image processing module 120. The communications module 121 can comprise computer-implemented instructions that manage the flow of data between the components of the multispectral imaging system 100. For example, the communications module 121 can include instructions that manage the receipt of image data from the multispectral imaging apparatus 110. The image processing module 120 also includes a storage module 129 configured to store various types of data, source code, and/or executable files. For example, the storage module 129 can be programmed to store image data received by the imaging apparatus 110 and/or image data processed by the image processing module 120.

The image processing module 120 can also include various modules that are programmed to implement various multispectral imaging applications. For example, the image processing module 120 includes a dark flash imaging module 123 that is programmed capture both the NIR image and the visible light image. In some implementations, the dark flash imaging module 123 may cause the visible light sensor 115 and the NIR sensor 117 to capture images of a target scene at substantially the same time. In another implementation, the dark flash imaging module 123 may cause the visible light sensor 115 and the NIR sensor 117 to capture images of a target scene in succession.

In addition, the image processing module 120 may include a hybrid imaging module 125. The hybrid imaging module 125 can be programmed to process both still images and video images captured by the imaging apparatus 110. For example, the hybrid imaging module 25 can be programmed to process still image data from the visible light sensor 115 and video image data from the NIR sensor 117, or vice versa. The still image data and the video image data can be simultaneously captured by the respective sensors in some arrangements; in other arrangements, the still and video image data can be captured at separate times. In various implementations, the still image data can be captured at a higher resolution than the video image data in order to reduce motion blur in images of a scene.

The image processing module 120 also includes a multispectral information processing module 127. The multispectral information processing module 127 can be programmed to process NIR image data captured from the NIR sensor 117 to enhance the quality of visible light image data captured from the visible light sensor 115 through a de-noising process. The multispectral information processing module 127 can include various sub-modules for carrying out a noise reduction process, as described below.

The multispectral information processing module 127 may include an image alignment module 124. The NIR sensor 117 and visible light sensor 115 may be spaced apart by a distance and may therefore capture a target scene using different framing and/or angles. NIR and visible light images may be aligned before the images are processed for noise reduction. The image alignment module 124 can be programmed to perform any preliminary operations on the NIR and visible light images, such as, e.g., confirming that the visible light sensor 115 and the NIR sensor 117 are aligned vertically. The image alignment module 124 can further be programmed to match pixels in the NIR image with pixels in the visible light image to form a plurality of matched pixel pairs. The image alignment module 124 can thereby provide an initial, pixel-by-pixel alignment of the NIR and visible light images based on image descriptors for each image. The image descriptors may be based in part on image gradients measured in the respective images.

The image alignment module 124 also can be programmed to generally align sparse portions of the NIR and visible light images. For example, the image alignment module 124 can be programmed to calculate pixel disparities for each matched pixel pair. In various implementations, the pixel disparities can be based on a pixel separation distance for each matched pixel pair. The image alignment module 124 can be programmed to assign weights to each matched pixel pair based at least in part on the calculated pixel disparities for each matched pixel pair. Once the weights are assigned, in various implementations, the matches with the higher weights are kept, while the matches with the lower weights are discarded. A piece-wise homographic constraint between the visible and NIR images can be estimated, and the matches that satisfy the homographic constraint can be kept for subsequent alignment processing.

Moreover, the image alignment module 124 can be programmed to align the NIR image with the visible light image based at least in part on the assigned weights. For example, the image alignment module 124 can propagate the sparse matching results to the dense matching results based on an intensity similarity value and/or a confidence map, e.g., such as the weights that were assigned. In some aspects, the NIR image can be warped to the perspective of the visible light image, or vice versa, to confirm that the alignment of the images is accurate.

The gradient scale map generation module 126 can be programmed to generate a gradient scale map from the NIR and RGB images. For example, as described above, the gradient scale map may be generated based on the differences and similarities between gradient vectors in the visible light image and the NIR image. Accordingly, the gradient scale map generation module 126 can be programmed to calculate the gradient vector values at each pixel in each of the visible and NIR images, for example by applying a derivative filter to pixel blocks and assigning a gradient vector value to a center pixel in each pixel block.

The gradient scale map generation module 126 may be further programmed to generate a gradient scale map based on a comparison of gradient vectors of the NIR image and visible light image. The gradient scale map accordingly may capture the nature of structure discrepancies and similarities between the NIR and visible light images. In some embodiments, the gradient scale map generation module 126 may assign a positive value or a negative value to each pixel location within the gradient scale map. For example, a positive value may indicate that an edge or object boundary is present with similar gradient direction vectors in both the visible light image and the NIR image. A negative value may indicate that an edge is present in both the visible light image and the NIR image, but the direction of the local gradient vector in the NIR image is reversed relative to the local gradient vector in the visible light image. A value of zero may indicate that an edge is present in the NIR image which is not present in the visible light image, for example due to highlights and shadows resulting from the NIR flash, or that an edge or structure present in the visible light image is not present in the NIR image, for example due to the different reflectance properties of an object in the scene to red and infrared light.

The denoising module 128 may be programmed to receive the gradient scale map values from the gradient scale map generation module 126 and to utilize such values for denoising the visible light image. In some embodiments, an optimal ratio map for de-noising by gradient transfer may be generated based on an analysis of the pixel-by-pixel values in the gradient scale map. When building the optimal ratio map, the denoising module 128 may take into account image quality enhancement factors such as adaptive smoothing, edge preservation and guidance strength manipulation. The optimal ratio map may represent the amount of guidance from the NIR image which the denoising module 128 may apply to the visible light image at each pixel.

In some embodiments, the denoising module 128 may be further programmed to perform an iterative denoising process on the visible light image. For example, a denoised visible light image may be sent with the NIR image back to the gradient scale map generation module 126 in order to generate an updated gradient scale map representing the similarities and differences between the gradient vector fields in the denoised visible light image and the NIR image. The denoising module 128 may use this updated gradient scale map to further denoise the denoised visible image. This process may be repeated, in some embodiments, until the updated gradient scale map varies less than a threshold amount from a previous gradient scale map. In some embodiments, the process may be repeated until a resulting denoised visible light image varies less than a threshold amount from the visible light image used to construct the updated gradient scale map.

Process Overview

Figure 2:
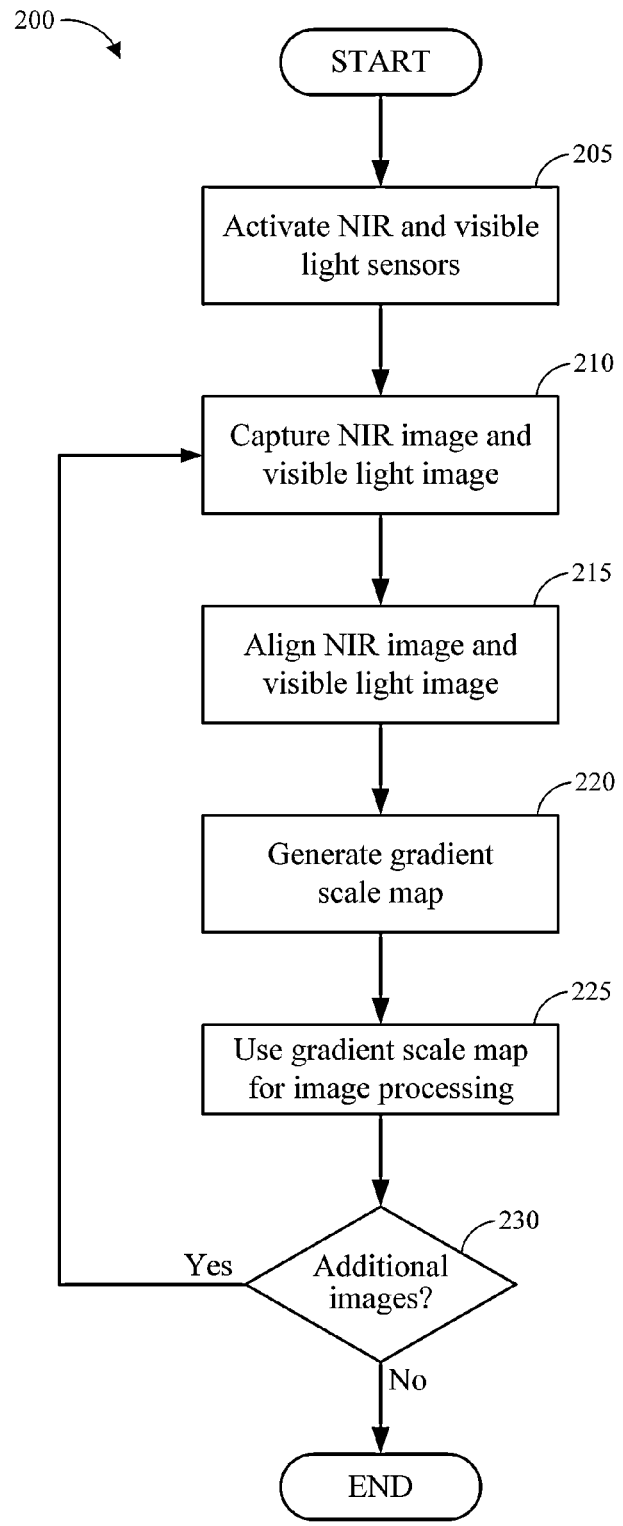
FIG. 2 is a flowchart of an embodiment of a method for capturing multispectral image data of a particular scene, according to one implementation.

FIG. 2 is a flowchart of a method 200 for capturing multispectral image data of a particular scene, according to one implementation. The illustrated method 200 begins in a block 205 wherein the NIR and visible light sensors are activated. For example, with reference to FIG. 1, the user may power up and/or boot-up the imaging system 100 to enable the sensors to capture the scene. In various implementations, an icon on a mobile device may be engaged to activate the NIR and visible light sensors 115 and 117. The method then moves to a block 210, wherein a visible light image is captured by the visible light sensor and a NIR image is captured by the NIR sensor. In various arrangements, a flash (e.g., visible and/or NIR flash) may be used to illuminate the scene.

After capturing the visible light and NIR images of the scene, the process 200 moves to a block 215, wherein the NIR image and the visible light image can be aligned with respect to the image alignment module 124 of FIG. 1. By accurately aligning the images, image artifacts caused by misalignment can be reduced or eliminated. The aligned images may be cropped to an overlapping region for subsequent processing.

The process 200 then moves to block 230 in which a gradient scale map representing the differences and similarities between the gradient vector fields of the NIR and visible light images is generated. As described above, the gradient scale map may be generated by computing the difference between gradient vector direction and gradient vector magnitude for each pixel of the NIR and visible light images.

Next, at block 225, the gradient scale map is used for image processing. For example, the gradient scale map may be used to determine a level of guidance applied from the NIR image to the visible light image for denoising the visible light image. In some embodiments, the gradient scale map may be used for dehazing or deblurring the visible light image, increasing sharpness or contrast in the visible light image, or for skin smoothening applications.

The process 200 then moves to a decision block 230, to determine whether additional images are to be processed. If a decision is made in decision block 230 that additional images are to be processed, then the method 200 returns to block 210 to capture additional NIR image data and visible light image data. If a decision is made in decision block 230 that no additional images are to be processed, then the method 200 terminates.

NIR and RGB Gradients Overview

Figure 3A:
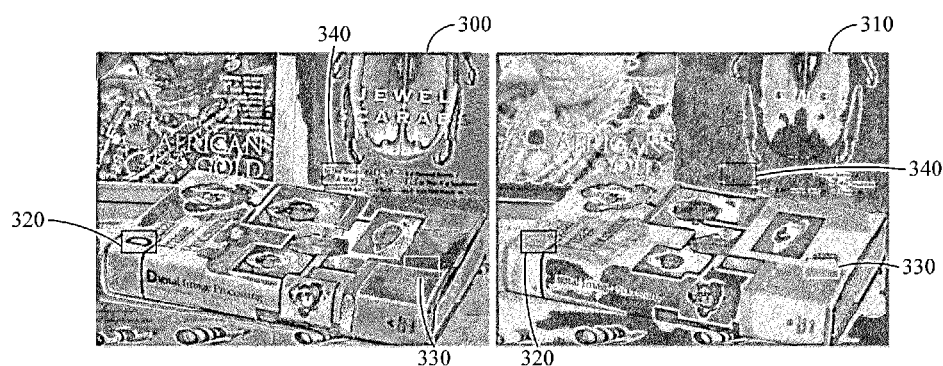
FIG. 3A illustrates an example RGB and NIR image.
Figure 3B:
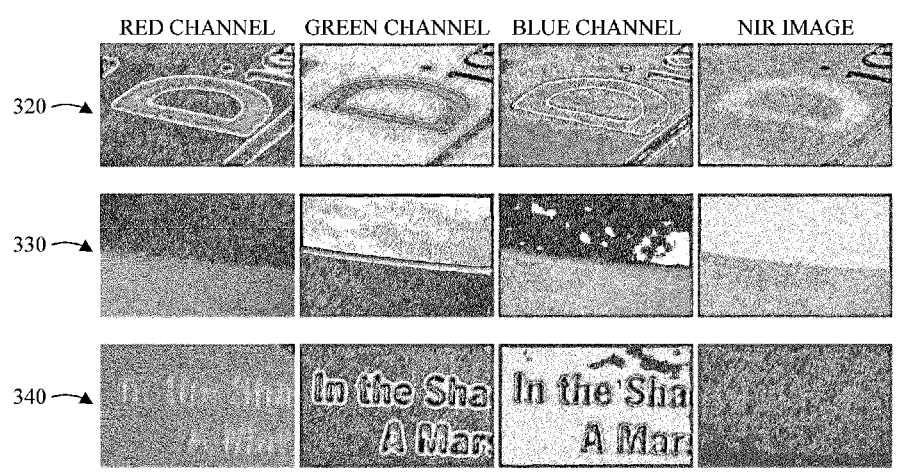
FIG. 3B illustrates various regions of the red, green, and blue channels of the RBG image of FIG. 3A and the corresponding regions of the NIR image of FIG. 3A.

FIG. 3A illustrates an example visible light image 300 and an example NIR image 310. In this example, the visible light image 300 is discussed as an RGB image, however the visible light image 300 may also be grayscale. FIG. 3B illustrates zoomed in views of various regions of the red, green, and blue channels of the RGB image 300 of FIG. 3A and the corresponding regions of the NIR image 310, noted by the rectangular borders 320, 330, and 340 over the images of FIG. 3A. Using the NIR image 310 to guide the denoising of the RGB image 300 may make a significant difference in detail distribution and intensity formation, compared to each channel of the RGB image (the red, green, and blue channels). Edge structure and gradient inconsistencies between the RGB 300 and NIR 310 images exists for nearly all pixels, as illustrated in FIGS. 3A and 3B and discussed in more detail below.

One structure inconsistency which may exist is gradient magnitude variation. As an example, as shown in the zoomed in views of the area 320, the letter 'D' on the book cover was captured with much lower contrast in the NIR image 310 than that in the RGB image 300. This effect may be due to the different reflectance characteristics to infrared and visible light.

Gradient direction divergence is another structure inconsistency, in which some gradient direction vectors in the RGB image 300 may be reversed with respect the gradient direction vectors located along a corresponding edge in the NIR image 310. To illustrate, in the red channel, green channel, and blue channel of the lower area 330 of the book cover are illustrated in FIG. 3B in comparison with the NIR channel of the same area 330. The gradient vector directions of the two images are reversed; that is, the lower pixel region in the red, green, and blue channels is lighter than the upper pixel region, while in the NIR image the upper pixel region is lighter than the lower pixel region. The pixels in upper and lower image regions change their relative intensity levels greatly, but in opposite directions in the RGB and NIR images.

Another structural inconsistency is gradient loss, in which some gradients presented in the RGB image 300 may be completely lost in the NIR image 310. As shown in the last row of FIG. 3B, the text visible in the red, green, and blue channels in the region 340 of the *Jewel Scarabs* book cover is totally missing from that same region 340 of the NIR image. This gradient loss may also be due to the different reflectance of the object in the scene to infrared and visible light. Though not illustrated, other structural inconsistencies may exists between pixel regions in the RGB and NIR images, for example resulting from differences in the highlights or shadows present in the respective image due to their different illumination sources.

In general, the content of the NIR image light may yield better contrast than the corresponding visible light image and carry richer levels of detail, which generates great potential for using the NIR image as a guidance image to enhance the quality of the RGB image. However, due to the structural inconsistencies discussed above, it is apparent that not all regions of the NIR image are suitable for use in enhancing the corresponding regions in the RGB image. To avoid guidance problems due to the structural inconsistencies between the RGB and NIR images, the denoising methods described herein employ the gradient scale map to describe the relationship between the gradient fields of the two images.

Gradient Scale Map Overview

Figure 4:
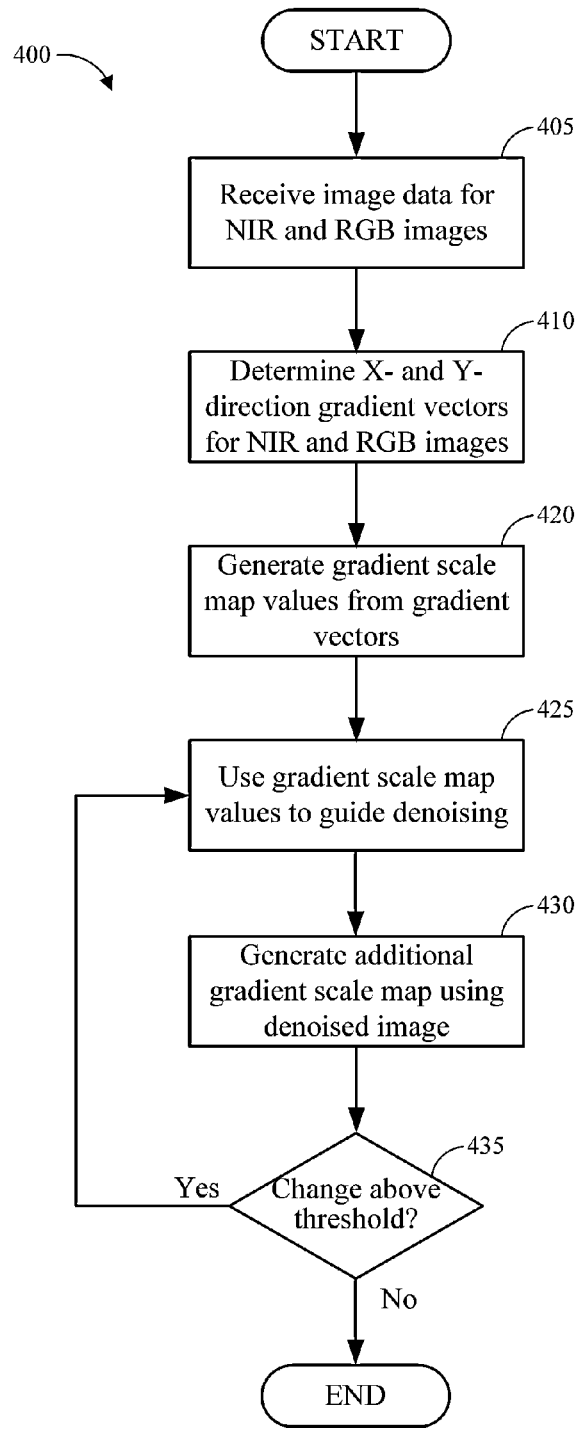
FIG. 4 is a flowchart of an embodiment of a method for generating a gradient scale map and using the gradient scale map for de-noising.

FIG. 4 is a flowchart illustrating an embodiment of a method for generating a gradient scale map and using the gradient scale map for de-noising. As discussed above, the gradient scale map may be generated to better handle the inherent discrepancy of structures between the visible light and NIR images. In some embodiments, the gradient scale maps may be defined as follows:

$$\min \|\nabla I^* - s \cdot \nabla G\|. \tag{1}$$

where $\nabla$ is an operator forming a vector with x- and y-direction gradients, $I^*$ is the ground-truth image, which represents an optimally de-noised visible light image, and G is the NIR image used as a guidance image in the de-noising process. In some embodiments, the gradient scale map s may represent a scale or ratio map between the gradient fields of the NIR and ground-truth images. It may have a few unique properties corresponding to structural discrepancies between $\nabla G$ and $\nabla I^*$.

The process 400 begins at block 405 when image data is received for an RGB image $I_0$, which may be a noisy image, as well as image data for the corresponding NIR flash image G, which may have neglectable noise. In order to recover a gradient scale map s and a clean image I from $I_0$ with noise removed and structure retained according to G, while persevering the overall visual appearance of $I_0$, the process 400 then moves to block 410 to determine x- and y-direction gradient vectors for each pixel in both the NIR and RGB images. In some embodiments this may be accomplished by applying horizontal and vertical linear convolution filters to pixel blocks of the NIR and RGB, as described above, to obtain gradient vector values for a center pixel in each block. In some embodiments, at least four pixels surrounding the center pixel may be used to compute the gradient vector value of the center pixel, however more may be used. For example, the gradient vector values for each pixel may be defined as a coordinate pair, e.g., (x, y), and the value of the "x" variable of the coordinate pair may indicate whether the gradient increases in the right or left directions, and the value of the "y" variable of the coordinate pair may indicate whether the gradient increases in an up or down direction, relative to the orientation of the image.

After computing the gradient vectors of the NIR image and the RGB image, the process 400 moves to block 420 in which the gradient scape map values are computed from the gradient vectors. In some embodiments, the gradient scale map may be a ratio between the values in the NIR and RGB gradient vectors. In some embodiments, the gradient scale map may include a positive value or a negative value for each pixel location. For example, a positive value may indicate that an edge is present with similar gradient directions in both the visible light image and the NIR image, while a negative value may indicate that an edge is present in both the visible light image and the NIR image, but that the direction of the local gradient vector in the NIR image is reversed relative to the local gradient vector in the visible light image. A value of zero may indicate that an edge is present in the NIR image which is not present in the visible light image, for example due to highlights and shadows resulting from the NIR flash, or that an edge is not present in the NIR image which is present in the visible light image, for example due to the different reflectance properties of a material in the images to visible and near-infrared light.

Next, the process 400 moves to block 425 to use the gradient scale map values to guide image de-noising of the visible light image $I_0$. The problem of obtaining a de-noised image I from $I_0$ using the gradient scale map s can be formulated as maximizing the following conditional probability.

$$P(I, s \mid I_0, G) = \frac{P(I_0 G \mid I, s)P(I, s)}{P(I_0, G)} \propto \quad (2)$$

$$P(I_0, G \mid I, s)P(I, s) \propto P(G \mid I, s)P(I_0 \mid I, s)P(s).$$

Here it is assumed that P(I) is a uniform distribution. By taking the negative logarithm of both sides, Eq. (2) can be re-written as $$E(s,I)=E_1(s,I)+\lambda E_2(I)+\beta E_3(s). \quad (3)$$

Eq. (3) contains three terms: $E_1(s,I)$ is the data term for s and I, representing the cost of using s to relate the estimated image I and the guidance image G; $E_2(I)$ is the date term for I representing how much the estimated image deviates from the input noisy image $I_0$; and $E_3(s)$ is a regularization term for s, enforcing penalty on the smoothness of s. Here, λ controls the confidence on the noisy image $I_0$, ranging from 1-10. β corresponds to smoothness of s. Its value may typically be set to [0.2-0.8] empirically.

In Eq. (4) below, I represents the de-noised iteration of the original noisy RGB image $I_0$, which is an estimation of the ground-truth image I*, and Eq. (1) is updated in pixel summation form as $$\min \sum_i \|\nabla I_i - s_i \cdot \nabla G_i\|, \quad (4)$$

where i indexes pixels in the gradient field of the NIR guidance image, represented by $\nabla G_i$. Here $\nabla G_i$ can be regarded as the scale for $s_i$ and can control the penalty when computing $s_i$ at different pixels. When using the cost function in this form, the final cost is highly dependent of value of $\nabla G_i$. For example, if $\nabla G_i$ and $\nabla I_i$ are doubled simultaneously, although $s_i$ remains the same, the cost from $|\nabla I_i - s_i \cdot \nabla G_i|$ will get doubled. Hence, the gradient magnitudes of $\nabla G_i$ make the cost highly unstable, adversely affecting the computation of $s_i$. To compensate for this, some embodiments of the process 400 may normalize the cost function as $$\sum_i \left| s_i - \frac{\nabla_x I_i}{\nabla_x G_i} \right| + \left| s_i - \frac{\nabla_y I_i}{\nabla_y G_i} \right|. \quad (5)$$

By dividing $\nabla G_i$ (considering its two components), the unexpected scaling effect caused by G is removed. To avoid the trivial situation that $\nabla_x G_i$ or $\nabla_y G_i$ is close to zero, and to enlist the ability to reject outliers, the data term for s and I may be defined as $$E_1(s, I) = \sum_i (\rho(s_i - p_{x,i}\nabla_x I_i) + \rho(s_i - p_{y,i}\nabla_y I_i)), \quad (6)$$

where ρ(x) is a robust function used to remove estimation outliers. It is defined as $$\rho(x)=|x|^\alpha, 0<\alpha<1, \quad (7)$$

and $p_{k,i}$ where k is in {x, y} is a truncation function set as $$p_{k,i} = \frac{1}{\text{sign}(\nabla_k G_i) \cdot \max(|\nabla_k G_i|, m|)}, \quad (8)$$

Where sign(x) is the sign operator, outputting 1 if x is positive or zero, and outputting −1 otherwise. The threshold m may be used to avoid division by zero and in some embodiments is set to 0.004 empirically.

The data term for I is simply set as $$E_2(I) = \sum_i \rho(I_i - I_{0,i}), \quad (9)$$

where ρ is the same robust function defined in Eq. (7). The data term may require that the restoration result does not deviate above a threshold amount from the input noisy image $I_0$ especially for important and salient edge areas. The robust function may beneficially be used to reject noise from $I_0$.

The regularization term may be defined specially with anisotropic gradient tensors. It is based on the fact that the values in the gradient scale map s are similar locally only in certain directions. For instance, s values should change smoothly or be constant along an edge more than the values across the edge. Uniformly smoothing s in all directions may either create discontinuity along a continuous edge or blur a sharp boundary.

Accordingly, the anisotropic tensor scheme is able to preserve sharp edges according to gradient directions of G. The anisotropic tensor may be expressed as $$D(\nabla G_i) = \frac{1}{(\nabla G_i)^2 + 2\eta^2}((\nabla G_i^\perp)(\nabla G_i^\perp)^T + \eta^2 1), \quad (10)$$

where $\nabla G_i^\perp$ is a vector perpendicular to $\nabla G_i$. 1 is an identity matrix and scalar that controls the isotropic smoothness. When $\nabla G_i$ is much smaller than ii, the anisotropic tensor reduces to be isotropic. In other more general cases, the anisotropic tensor can be decomposed to $$D(\nabla G_i) = (v_1 \quad v_2) \begin{pmatrix} \mu_1 & 0 \\ 0 & \mu_2 \end{pmatrix} \begin{pmatrix} v_1^T \\ v_2^T \end{pmatrix}, \quad (11)$$

where the two orthogonal eigenvectors of $D(\nabla G_i)$ are $$v_1 = \frac{\nabla G_i}{|\nabla G_i|}, \quad (12)$$
$$v_2 = \frac{\nabla G_i^\perp}{|\nabla G_i|},$$

with corresponding eigenvalues $$\mu_1 = \frac{\eta^2}{((\nabla G_i)^2 + 2\eta^2)}, \quad (13)$$
$$\mu_2 = \frac{((\nabla G_i)^2 + \eta^2)}{((\nabla G_i)^2 + 2\eta^2)}.$$

This form makes it possible to express regularization for s as $$E_3(s) = \sum_i \left(\mu_1 (v_1^T \nabla s_i)^2 + \mu_2 (v_2^T \nabla s_i)^2\right) \quad (14)$$

Different smoothness penalties may be controlled by $\mu_1$ and $\mu_2$ and in directions $v_1$ and $v_2$ across and along edges respectively. Stronger smoothness is naturally imposed along edges.

After defining each term for Eq. (3), the final objective function is expressed as $$E(s, I) = \sum_i (\rho(s_i - p_{x,i} \nabla_x I_i) + \rho(s_i - p_{y,i} \nabla_y I_i)) + \lambda \sum_i \rho(I_i - I_{0,i}) \quad (15)$$
$$+ \beta \sum_i \left(\mu_1 (v_1^T \nabla s_i)^2 + \mu_2 (v_2^T \nabla s_i)^2\right)$$

The objective function in Eq. (15) is non-convex due to the sparsity terms. Joint representation for s and I in optimization further complicates the problem. Naively solving it by simple gradient decent cannot guarantee optimality and may lead to very slow convergence even for a local minimum. The illustrated embodiment employs a weighted least square scheme, which enables the original problem—the objective function in Eq. (15)—to be solved using a few corresponding linear systems without losing the original properties. However, there are many standard numerical solutions which can be used to resolve this problem.

Initially, robust function $\rho(x)$ in Eq. (4) for any scalar x can be approximated as $$\rho(x) \approx \phi(x) \cdot x^2, \quad (16)$$

where $\phi(x)$ is defined as $$\phi(k) = \frac{1}{|x|^{2-\alpha} + \varepsilon}. \quad (17)$$

Here, $\varepsilon$ may be a small number to avoid division by zero. This form enables splitting the robust function into two parts where $\phi(x)$ can be regarded as a weight for $x^2$. During the process 400, following the tradition of reweighted least squares, $\phi(x)$ and $x^2$ are updated alternatively during optimization, because each of $\phi(x)$ and $x^2$ can be utilized together with other terms to form simpler representation, profiting optimization. By using the weighted least squares scheme, Eq. (3) may be re-written in the vector form as follows:

$$E(s,I) = (s - P_x C_x I)^T A_x (s - P_x C_x I) + (s - P_y C_y I)^T A_y (s - P_y C_y I) + \lambda (I - I_0) B (I - I_0) + \beta s L s, \quad (18)$$

where s, I and $I_0$ are vector representation of s, I and $I_0$. $C_x$ and $C_y$ are discrete backward difference matrices that are used to compute image gradients in the x- and y-directions. $P_x$, $P_y$, $A_x$, $A_y$ and B are all diagonal matrices, whose i-th diagonal elements are defined as $$(P_x)_{ii} = p_{x,i}, (A_x)_{ii} = \phi(s_i - p_{x,i} \nabla_x I_i),$$

$$(P_y)_{ii} = p_{y,i}, (A_y)_{ii} = \phi(s_i - p_{y,i} \nabla_y I_i),$$

$$B_{ii} = \phi(I_i - (I_0)_i).$$

Among them, $A_x$ $A_y$ and B account for the re-weighting process and are typically computed using estimates from previous iteration; $P_x$ and $P_y$ are normalization terms from the guided input G.

Note that the last term of Eq. (18) controls the spatial smoothness of s where matrix L is a smoothing Laplacian, nontrivially expressed as $$L = C_x^T (\Sigma_1 V_x^2 + \Sigma_2 V_y^2) C_x + C_y^T (\Sigma_2 V_x^2 + \Sigma_1 V_y^2) C_y + 2 C_y^T (\Sigma_1 - \Sigma_2) V_x V_y C_x, \quad (19)$$

where $\Sigma_1$, $\Sigma_2$, $V_1$ and $V_2$ are all diagonal matrices. Their i-th diagonal elements are defined as $$(\Sigma_1)_{ii} = \mu_1, (V_x)_{ii} = \nabla_x G_i / \max(|\nabla G_i|, m),$$

$$(\Sigma_2)_{ii} = \mu_2, (V_y)_{ii} = \nabla_y G_i / \max(|\nabla G_i|, m).$$

Next, the process 400 moves to block 430, where the denoised image is used to generate an additional gradient scale map, such that the process 400 advantageously employs an alternating minimization process to solve Eq. (18). Results of s and I in each iteration t are denoted as $s^{(t)}$ and $I^{(t)}$. Initially, $s^{(0)} = 1$, in which elements are all 1s and $I^{(t)} = I_0$. By setting all initial $s_i$ to 1s, high smoothness can be achieved. It yields zero cost for $E_3(s)$, a very nice starting point for optimization. This initialization also makes the starting $\nabla I$ same as $\nabla G$ with many details. Then at iteration t+1, the following two sub-problems may be solved sequentially.

Solve for $s^{(t+1)}$: given $s^{(t)}$ and $I^{(t)}$, minimize $E(s,I)$ to get $s^{(t+1)}$. By taking derivatives of $E(s,I)$ on s and setting them to 0s, the sparse linear system may be obtained $$(A_x^{(t,t)} + A_y^{(t,t)} + \beta L) s = A_x^{(t,t)} P_x C_x I^{(t)} + A_y^{(t,t)} P_y C_y I^{(t)}, \quad (20)$$

where $A_x^{(t,t)}$ and $A_y^{(t,t)}$ are calculated using $s^{(t)}$ and $I^{(t)}$. This may be solved using pre-conditioned conjugate gradient (PCG). The solution is denoted by $s^{(t+1)}$.

Solve for $I^{(t+1)}$: given $s^{(t+1)}$ and $I^{(t)}$, minimize $E(s,I)$ to get $I^{(t+1)}$. Similarly, by taking derivatives of $E(s,I)$ on I and setting them to 0s, the final sparse linear system for solving I is $$(C_x^T(P_x)^2 A_x^{(t+1,t)} C_x + C_y^T(P_y)^2 A_y^{(t+1,t)} C_y + \lambda B^{(t+1,t)})I = \quad (21)$$
$$(C_x^T P_x A_x^{(t+1,t)} + C_y^T P_y A_y^{(t+1,t)})s + \lambda B^{(t+1,t)} I_0,$$

where $A_x^{(t+1,t)}$ and $A_y^{(t+1,t)}$ are calculated using $s^{(t+1)}$ and $I^{(t)}$. $B^{(t+1,t)}$ depends on $I^{(t)}$. The linear system is also solved using PCG to obtain $I^{(t+1)}$.

The two steps repeat until, at decision block 435, the process 400 determines that s and I do not change above a threshold amount. In some embodiments, three to six iterations may be enough to generate visually pleasing results.

Compared to existing image de-noising methods such as BM3D, joint BF, and existing dark flash methods, the iterative process 400 disclosed herein provides several advantages such as preservation of colors, contrast, and image structures in the final de-noised image and avoidance of artifacts along edges. Specifically, compared with the result of existing dark flash de-noising methods, the result of the denoising processes described herein has better overall contrast and is able to avoid staircase artifacts along noisy edges. Both methods enforce color similarity with the original RGB image and gradient similarity with the guided image. However, existing dark flash methods use a heuristic sparse gradient constraint, which inherently is not well adapted to address the differences between the original RGB image and the NIR flash image. Large changes in the gradients of the RGB image may lead to the reduction of the image contrast when conventional dark flash methods are used. In contrast, the method 400 as described herein uses the gradient scale map to well model the discrepancies and similarities between the image pair. Accordingly, the de-noising method 400 is able to constrain the gradients of the noisy RGB image to be close to those of the ground-truth image of the target image scene with no noise. In addition, the anisotropic tensor scheme used in the process 400 helps to reduce staircase artifacts caused by sparse gradient constraint.

De-Noising Process Images Overview

Figure 5:
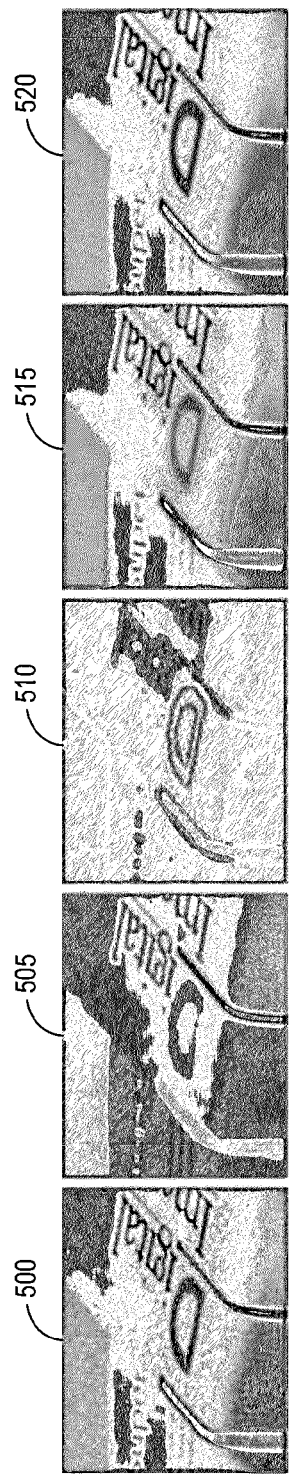
FIG. 5 illustrates an example of images at various steps of a de-noising process.

FIG. 5 illustrates the various images and stages of the denoising process 400 described above. In this embodiment, the original RGB image 500 has a high noise level, and some gradients of the NIR flash image 505 are reverted and weaker compared with the gradients of the noisy RGB image 500. FIG. 5 also illustrates a gradient scale map 510, an iteration of an estimated de-noised image 515, and a final de-noised image 520.

TERMINOLOGY

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An electronic method for image de-noising, the method comprising:
receiving image data comprising a NIR image and a visible light image;
aligning pixels in the NIR image with corresponding pixels in the visible light image;
determining gradient vectors in the NIR image and gradient vectors in the visible light image;

generating a gradient scale map from the gradient vectors in the NIR image and the gradient vectors in the visible light image; and using the gradient scale map to de-noise the visible light image.

2. The method of claim 1, wherein using the gradient scale map to de-noise the visible light image further comprises using pixel-by-pixel gradient scale map values to determine a level of de-noising guidance from the NIR image.

3. The method of claim 1, wherein using the gradient scale map to de-noise the visible light image comprises employing a weighted least squares smoothing technique to remove noise from the visible light image.

4. The method of claim 2, wherein the pixel-by-pixel gradient scale map values represent a level of difference between the gradient vectors in the NIR image and the gradient vectors in the visible light image.

5. The method of claim 1, wherein using the gradient scale map to de-noise the visible light image further comprises generating a de-noised image, the method further comprising:
    determining gradient vectors in the de-noised image; and
    generating an additional gradient scale map from the gradient vectors in the NIR image and the gradient vectors in the de-noised image.

6. The method of claim 5, further comprising computing a difference between the gradient scale map and the additional gradient scale map.

7. The method of claim 6, further comprising:
    comparing the difference to a threshold; and
    if the difference is greater than the threshold, using the additional gradient scale map to de-noise the de-noised image, or, if the difference is less than the threshold, outputting the de-noised image as a final image.

8. A multispectral imaging system comprising:
    a near infrared (NIR) imaging sensor configured to capture a NIR image;
    a visible light imaging sensor configured to capture a visible light image;
    a gradient scale map generation module programmed to:
        determine gradient vectors in the NIR image and gradient vectors in the visible light image; and
        generate a gradient scale map from the gradient vectors in the NIR image and the gradient vectors in the visible light image; and
    a de-noising module programmed to de-noise the visible light image using the gradient scale map.

9. The system of claim 8, wherein the de-noising module is further programmed to de-noise the visible light image using the gradient scale map by employing a weighted least squares smoothing technique.

10. The system of claim 8, further comprising an image alignment module configured to align the NIR image and the visible light image.

11. The system of claim 8, further comprising a NIR flash configured to illuminate the NIR image with light in a spectrum of infrared wavelengths.

12. The system of claim 8, wherein the gradient scale map generation module is programmed to compare the gradient vectors in the NIR image to the gradient vectors in the visible light image to generate pixel-by-pixel gradient scale map values.

13. The system of claim 12, wherein the de-noising module is programmed to use the pixel-by-pixel gradient scale map values to determine an amount of de-noising guidance from the NIR image for each pixel in the visible light image.

14. The system of claim 8, wherein de-noising the visible light image using the gradient scale map generates a de-noised image, and wherein the de-noising module is programmed to generate an additional gradient scale map based on gradient vectors in the de-noised image and the gradient vectors in the NIR image.

15. The system of claim 14, wherein de-noising module is programmed to de-noise the de-noised image using the additional gradient scale map, thereby generating a second iteration de-noised image.

16. The system of claim 15, wherein the de-noising module is programmed to continue generating further additional gradient scale maps until a difference between a current gradient scale map and a previous gradient scale map is below a threshold.

17. The system of claim 15, wherein the de-noising module is programmed to continue de-noising iterations with further additional gradient scale maps and further iteration de-noised images until a difference between a current iteration de-noised image and a previous iteration de-noised image is below a threshold.

18. An imaging system, comprising:
    means for capturing a NIR image;
    means for capturing a visible light image;
    means for determining gradient vectors in the NIR image and gradient vectors in the visible light image;
    means for generating a gradient scale map from the gradient vectors in the NIR image and the gradient vectors in the visible light image; and
    means for de-noising the visible light image using the gradient scale map.

19. The imaging system of claim 18, wherein the means for determining gradient vectors and the means for generating a gradient scale map include a gradient scale map module.

20. The imaging system of claim 18, wherein the means for capturing the NIR image includes a NIR image sensor and a NIR flash.

21. The imaging system of claim 18, further comprising means for aligning the NIR image and the visible light image.

22. The imaging system of claim 21, wherein the means for aligning the NIR image and the visible light image includes an image alignment module.

23. The imaging system of claim 18, wherein the means for de-noising the visible light image includes a de-noising module.

24. A non-transitory computer-readable medium having stored thereon code that when executed performs a method comprising:
    receiving image data comprising a NIR image and a visible light image;
    aligning pixels in the NIR image with corresponding pixels in the visible light image;
    determining gradient vectors in the NIR image and gradient vectors in the visible light image;
    generating a gradient scale map from the gradient vectors in the NIR image and the gradient vectors in the visible light image; and
    using the gradient scale map to de-noise the visible light image.

25. The non-transitory computer-readable medium of claim 24, wherein the method further comprises using pixel-by-pixel gradient scale map values to determine a level of de-noising guidance from the NIR image.

26. The non-transitory computer-readable medium of claim 24, wherein using the gradient scale map to de-noise the visible light image further comprises generating a de-noised image.

27. The non-transitory computer-readable medium of claim 26, wherein the method further comprises determining gradient vectors in the de-noised image and generating an additional gradient scale map from the gradient vectors in the NIR image and the gradient vectors in the de-noised image.

28. The non-transitory computer-readable medium of claim 27, wherein the method further comprises computing a difference between the gradient scale map and the additional gradient scale map.

29. The non-transitory computer-readable medium of claim 28, wherein the method further comprises comparing the difference to a threshold, wherein if the difference is greater than the threshold, the method further comprises using the additional gradient scale map to de-noise the de-noised image, or, if the difference is less than the threshold, the method further comprises outputting the de-noised image as a final image.

30. The non-transitory computer-readable medium of claim 24, wherein the method further comprises capturing the NIR image using NIR flash within a predetermined time interval of capturing the visible light image.

* * * * *